US012779896B2

(12) United States Patent
Sperlik

(10) Patent No.: US 12,779,896 B2
(45) **Date of Patent: *Nov. 3, 2026**

(54) DEVICE AND METHOD FOR REMOVING A LIQUID FROM A CONTAINER HAVING A DEPRESSIBLE VALVE

(71) Applicant: SOPHISTICATED SOLUTIONS, LLC, Orlando, FL (US)

(72) Inventor: Nathan Sperlik, Statham, GA (US)

(73) Assignee: SOPHISTICATED SOLUTIONS, LLC, Orlando, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/064,854

(22) Filed: Feb. 27, 2025

(65) Prior Publication Data

US 2025/0196526 A1 Jun. 19, 2025

Related U.S. Application Data

(63) Continuation of application No. 18/330,180, filed on Jun. 6, 2023, now Pat. No. 12,275,270.

(Continued)

(51) Int. Cl.

*B43K 5/02* (2006.01)
*B43K 5/18* (2006.01)

(Continued)

(52) U.S. Cl.

CPC .................. *B43K 5/02* (2013.01); *B43K 5/18* (2013.01); *B43K 11/00* (2013.01); *B65D 83/14* (2013.01);

(Continued)

(58) Field of Classification Search

CPC ........ B65D 83/14; B65D 83/16; B65D 83/20; B65D 83/24; B65D 83/205; B65D 83/207; B65D 83/40; B43K 5/02; B43K 5/18

(Continued)

(56) References Cited

U.S. PATENT DOCUMENTS 2,938,499 A * 5/1960 Lindenbaum .......... B43K 11/00 141/20.5
4,341,348 A 7/1982 Dearling (Continued)

FOREIGN PATENT DOCUMENTS

CN 217565948 U * 10/2022
DE 102015100201 A1 7/2016

(Continued)

OTHER PUBLICATIONS

Krewline, "210 Cap by krewline", webpage, krewline.com, https://www.krewline.com/.

(Continued)

*Primary Examiner* — Jennifer C Chiang

(74) *Attorney, Agent, or Firm* — Jacob M. Ward; Ward Law Office LLC

(57) ABSTRACT

Embodiments of the present disclosure may include a device for removing a liquid from a container having a depressible valve. The device may include a reservoir for holding the liquid removed from the container. A conduit of the device may include a first end and a second end. The first end may be fluidly coupled to the reservoir while the second end may be coupled to the container. Depressing the conduit may actuate the depressible valve of the container to provide fluid communication of the liquid from the container, through the conduit, and into the reservoir.

19 Claims, 9 Drawing Sheets

Related U.S. Application Data

(60) Provisional application No. 63/349,259, filed on Jun. 6, 2022.

(51) Int. Cl.
*B43K 11/00* (2006.01)
*B65D 83/14* (2006.01)
*B65D 83/16* (2006.01)
*B65D 83/20* (2006.01)
*B65D 83/24* (2006.01)
*B65D 83/40* (2006.01)
*B67D 7/02* (2010.01)

(52) U.S. Cl.
CPC ............ *B65D 83/16* (2013.01); *B65D 83/20* (2013.01); *B65D 83/24* (2013.01); *B65D 83/40* (2013.01); *B67D 7/0294* (2013.01)

(58) Field of Classification Search
USPC .......................................................... 401/123
See application file for complete search history.

(56) References Cited

U.S. PATENT DOCUMENTS

| | | | |
|---|---|---|---|
| 5,884,816 | A | 3/1999 | Hinze |
| 6,000,579 | A | 12/1999 | Sugimoto et al. |
| 6,021,927 | A | 2/2000 | Nomiyama et al. |
| 8,646,661 | B2 | 2/2014 | Paine |
| 10,589,920 | B2 | 3/2020 | Fore |
| 11,130,143 | B2 | 9/2021 | Fore |
| 2005/0156058 | A1 | 7/2005 | Kosmyna et al. |

FOREIGN PATENT DOCUMENTS

| | | | |
|---|---|---|---|
| EP | 3336010 | B1 | 9/2020 |
| GB | 2450104 | A | 12/2008 |
| WO | 2015115868 | A1 | 8/2015 |

OTHER PUBLICATIONS

Model Cars Magazine Forum, "Decanting Spray Paint for Airbrush Use", forum discussion on webpage, modelcarsmag.com, http://www.modelcarsmag.com/forums/topic/4122-decanting-spray-paint-for-airbrushuse/.

Uline, "Spray Can Holder/Gun", webpage, uline.com, Model No. H-505, US, https://www.uline.com/Product/Detail/H-505/Paint-And-Coatings/Spray-Can-Holder-Gun.

Graff-City, "Graff-City Mop Catch 210 Cap Kit", webpage, graff-city.com, UK, https://www.graff-city.com/replacement-caps-c77/special-caps-c174/graff-city-mop-catch-210-cap-kit-p3814.

Preval, "Preval Sprayer", webpage, preval.com, US, https://preval.com/diy-pro-products/preval-sprayer/.

Caves, Julie, "Empty Marker Pens to Fill With Ink or Paint", webpage, Jacksonsart.com, May 20, 2015, UK, https://www.jacksonsart.com/blog/2015/05/20/empty-marker-pens-to-fill-with-ink-or-paint/.

Cadillacpat, "Removing Paint From Aerosol Cans", webpage, hobbytalk.com, Feb. 21, 2009, https://www.hobbytalk.com/threads/removing-paint-from-aerosol-cans.245786/.

Written Opinion of the International Searching Authority dated Sep. 12, 2023.

* cited by examiner

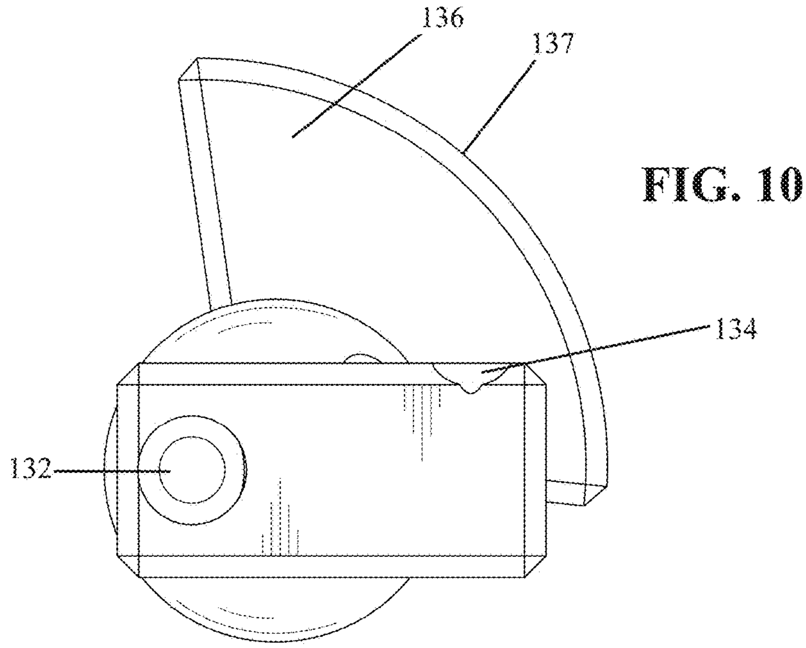
FIG. 10
FIG. 11
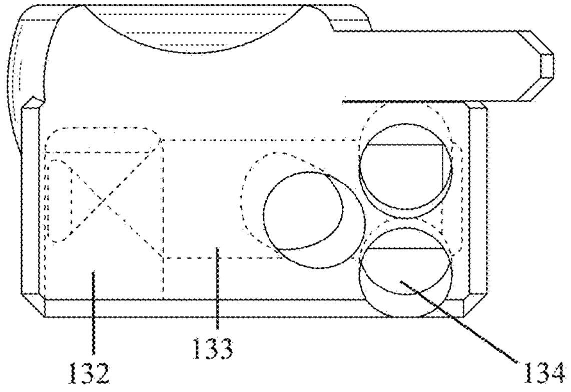
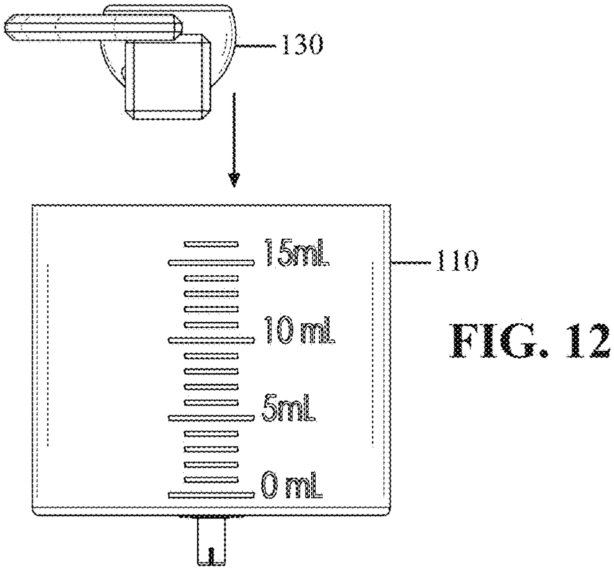
FIG. 12

DEVICE AND METHOD FOR REMOVING A LIQUID FROM A CONTAINER HAVING A DEPRESSIBLE VALVE

CROSS-REFERENCE TO RELATED APPLICATIONS

This application is a continuation of U.S. application Ser. No. 18/330,180, filed Jun. 6, 2023, which claims the benefit of U.S. Provisional Application No. 63/349,259 filed on Jun. 6, 2022. The entire disclosures of the above applications are incorporated herein by reference.

FIELD

The present technology includes articles of manufacture and processes that relate to painting and touch-up painting, including a reservoir which may be used to remove paint from a container and hold the paint for touch-up applications.

INTRODUCTION

This section provides background information related to the present disclosure which is not necessarily prior art.

A correct and even application of paint is important for any paint job. When using an aerosol paint can, it is important to hold the can upright and maintain a proper distance from a surface and spray in even misting passes. However, even with consistent and accurate application, imperfections may occur. In addition, the paint may be bumped, chipped, or scraped causing damage to the painted area, which must be repaired. Manually applied touch-up paint may be used to cover such imperfections. Touch-up paint applied in the proper color may be an easy and inexpensive solution to correct these imperfections. However, if it is applied incorrectly, the touch-up paint may highlight, rather than fix any imperfections.

Touch-up paint may be applied in various ways, including use of paint sources supplied by aerosols, brush-in-cap bottles, and paint pens. Each type has an appropriate application situation. Aerosols are good for larger blemishes and recessed areas, while brush-in-cap bottles and paint pens are ideal for small nicks or scratches. One problem with an aerosol toner or a spray paint is that if the same product is used for touch-ups, there is not an efficient way to remove paint from the aerosol container and place it in a separate reservoir so the paint may be applied with a brush or other implement that may finely apply the paint.

Accordingly, there is a need for a way to easily eliminate the mess and waste of material that happens when liquid is transferred to a reservoir for later use.

SUMMARY

In concordance with the instant disclosure, a device and method of use that easily eliminate the mess and waste of material associated with transferring liquid to a reservoir for later use, are surprisingly discovered.

Various embodiments of the present invention relate to a device and associated method of using the device to removing a liquid from a container having a depressible valve. The device may include a reservoir for holding the liquid removed from the container. A conduit of the device may include a first end and a second end. The first end may be fluidly coupled to the reservoir while the second end may be coupled to the container. Depressing the conduit may actuate the depressible valve of the container to provide fluid communication of the liquid from the container, through the conduit, and into the reservoir.

In certain embodiments, the reservoir may be contained within a writing implement. The reservoir may then be in fluid communication with a distal end of the writing implement opposite the conduit. The distal end may be configured to dispense the liquid from the reservoir.

In certain embodiments, the reservoir may include a top and a bottom, where the first end of the conduit is disposed intermediate the top and the bottom of the reservoir. The second end of the conduit may extend outward from the bottom of the reservoir. The first end of the conduit may be coaxial with the reservoir. In certain embodiments, the reservoir may include an indicium configured to measure an amount of liquid within the reservoir. The device may further include a cap configured to be removably coupled with the first end of the conduit. In particular, the conduit may be configured to direct the liquid from the container, through the conduit, and into the reservoir when the conduit is depressed using the cap.

The cap may include a bottom aperture configured to be removably coupled with the first end of the conduit. In certain embodiments, the cap may include an exit aperture fluidly coupled to the bottom aperture, where the exit aperture is configured to direct liquid to the reservoir when the conduit is depressed using the cap. The exit aperture may be fluidly coupled to the bottom aperture by a channel orthogonal to the bottom aperture. The exit aperture may comprise a plurality of exit apertures. The plurality of exit apertures may include three apertures.

In certain embodiments, the cap may include a flange configured to engage an interior side of the reservoir. The flange may be configured to be positioned between a top of the reservoir and the exit aperture when the cap is coupled to the first end of the conduit. In certain embodiments, the flange may include a curved edge configured to engage a portion of a curved interior side of the reservoir. The flange may engage a minority of, a majority of, or the entire circumference of the curved interior side of the reservoir. In certain embodiments, the cap may include a concave surface for depressing the cap onto the conduit.

A method of removing a liquid from a container having a depressible valve may include removably attaching a device for removing the liquid from the container. The device may include a reservoir for holding the liquid removed from the container and a conduit including a first end and a second end. The first end of the conduit may be fluidly coupled to the reservoir and the second end of the conduit may be fluidly coupled to the container. Depressing the conduit onto the depressible valve of the container may direct liquid from the container to the reservoir. In certain embodiments, the method may further include removing the device from the container and accessing the liquid within the reservoir.

DRAWINGS

The drawings described herein are for illustrative purposes only of selected embodiments and not all possible implementations and are not intended to limit the scope of the present disclosure.

FIG. 10 is a bottom plan view illustrating the cap for a device for removing a liquid from a container, according to an embodiment of the present disclosure.

FIG. 11 is a front elevational cutaway view along the plane A-A of FIG. 9 illustrating the cap for a device for removing a liquid from a container, according to an embodiment of the present disclosure.

FIG. 12 is a front elevational view illustrating the cap being removably coupled to the reservoir of a device for removing a liquid from a container, according to an embodiment of the present disclosure.

DETAILED DESCRIPTION

Figure 1:
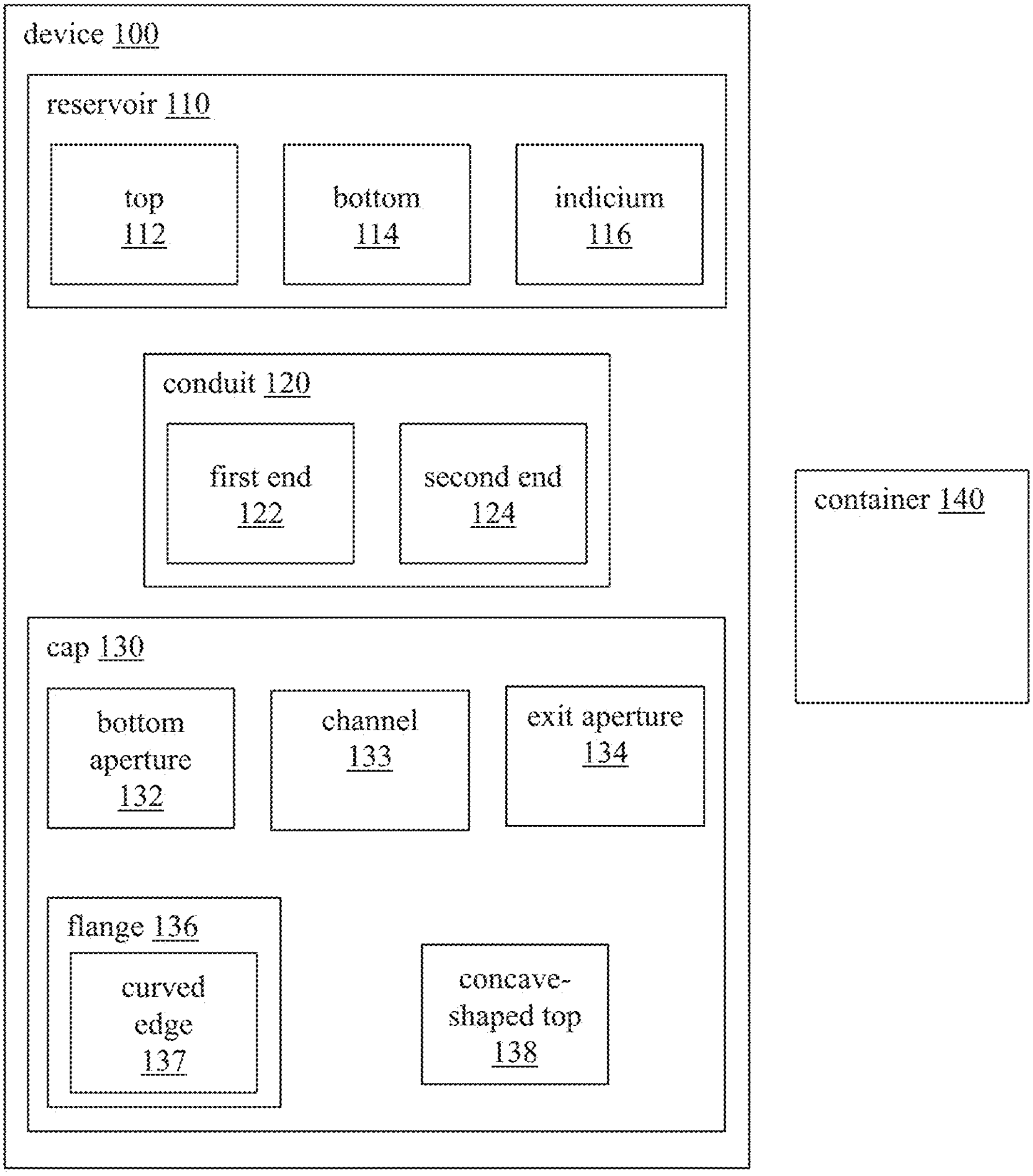
FIG. 1 is a block diagram illustrating a device for removing a liquid from a container, according to an embodiment of the present disclosure.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed, unless expressly stated otherwise. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology relates to a device for removing a liquid from a container having a depressible valve. The device may include a reservoir for holding the liquid removed from the container. A conduit of the device may include a first end and a second end. The first end may be fluidly coupled to the reservoir while the second end may be fluidly coupled to the container. Depressing the conduit may actuate the depressible valve of the container to provide fluid communication of the liquid from the container, through the conduit, and into the reservoir. In certain embodiments, the container may include an aerosol container. However, as would be apparent to someone of ordinary skill in the art, the container may include any container including a depressible valve where it is desirable to remove the liquid therefrom.

In certain embodiments, the device may include a reservoir for holding the liquid removed from the container. The conduit of the device may include a first end and a second end. The first end may be fluidly coupled to the reservoir while the second end may be fluidly coupled to the container. Depressing the conduit may actuate the depressible valve of the container to provide fluid communication of the liquid from the container, through the conduit, and into the reservoir.

In certain embodiments, the reservoir may be substantially cylindrical in shape and include an open top. However, as would be understood by someone of ordinary skill in the art, the reservoir may include any desired shape and/or orientation capable of holding a liquid. For example, in certain embodiments, the reservoir may be contained within a writing implement. Where the reservoir is contained within a writing implement, the reservoir may be in fluid communication with a distal end of the writing implement opposite the conduit. The distal end may be configured to dispense the liquid from the reservoir. In particular, it is contemplated that the reservoir may be implemented within a paint pen, a refillable marker, and other similar writing implements. In particular, the reservoir may be any appropriate receptacle for receiving the liquid for access by a user. For example, the reservoir may be open such that the user may access the liquid using a paint brush or other implement which may be used to convey the liquid to a surface.

In certain embodiments the reservoir may include an indicium configured to measure an amount of liquid within the reservoir. The reservoir may include any appropriately desired number of indicia for indicating an amount of liquid within the reservoir. For example, the reservoir may include indicia, which indicates that the reservoir is being filled with liquid at 5 mL increments. In this manner, a user may fill the reservoir an appropriate amount without overfilling the reservoir and provide enough liquid necessary for use.

The reservoir may include a top and a bottom wherein the first end of the conduit may be disposed intermediate the top and the bottom of the reservoir. Thus, the reservoir may be filled with liquid to a position below the first end of the conduit so that the liquid does not overflow back into the conduit when transferred into the reservoir. The second end of the conduit may extend outward from the bottom of the reservoir in order to securely connect to the container having a depressible valve. In certain embodiments, the second end of the conduit may be removable, and/or configured to telescope into the conduit such that second end of the conduit is substantially level with the bottom of the reservoir. In this manner, the reservoir may be removed from the container having a depressible valve and securely set on a flat surface where the liquid within the reservoir may be accessed. Alternatively, the reservoir may be removed from the container having a depressible valve and coupled with a palette, such as described within U.S. Provisional Patent Application No. 63/491,309 titled Universal Connectable Palette, the entire disclosure of which is incorporated herein by reference.

In certain embodiments, the device may further include a cap. The cap may be configured to be removably coupled with the first end of the conduit. The conduit may be depressed using the cap to direct the liquid from the container through the conduit and into the reservoir. The cap may include a bottom aperture configured to be removably coupled with the first end of the conduit. The cap may also include an exit aperture fluidly coupled to the bottom aperture. The exit aperture may direct liquid to the reservoir when the conduit is depressed using the cap.

In certain embodiments, the exit aperture may be fluidly coupled to the bottom aperture by a channel orthogonal to the bottom aperture. In certain embodiments, the exit aperture may include a plurality of exit apertures. In particular embodiments, the exit aperture may include three apertures. However, as would be understood by someone of ordinary skill in the art, the exit aperture may include any appropriately desired number of apertures. In certain embodiments, an amount of exit apertures may be selected to adjust a flow rate of the liquid into the reservoir. The cap may include additional apertures within the body of the cap for venting and/or adjusting other characteristics of the flow of the liquid including the flow rate from the from the container having a depressible valve.

In certain embodiments, the cap may include a flange configured to engage an interior side of the reservoir. The flange may be configured to be positioned between a top of the reservoir and the exit aperture when the cap is coupled to the first end of the conduit. The flange may shield liquid from leaving the reservoir when the cap is depressed onto the conduit. In particular, when the cap is depressed, the flange may slide along the side of the reservoir to shield liquid from leaving the reservoir as the cap is depressed. In certain embodiments, the flange may include a curved edge configured to engage all or a portion of a curved interior side of the reservoir. In a particular embodiment, the flange may engage an entire circumference of the curved interior side of the reservoir, such that the flange may cover the reservoir and/or function as a lid for the reservoir to shield the liquid from exiting the reservoir. The flange may include a perforation, and/or a series of perforations for venting the device as the cap is depressed onto the conduit.

In certain embodiments, the cap may include a concave surface for depressing the cap onto the conduit. The concave surface of the cap may be configured to uniformly fit a finger and/or a thumb to aid a user when depressing the cap onto the conduit. However, as would be understood by someone of ordinary skill in the art, the cap may include any appropriately desired shape for being pressed onto the conduit.

Example embodiments of the present technology are provided with reference to the several figures enclosed herewith.

Figure 2:
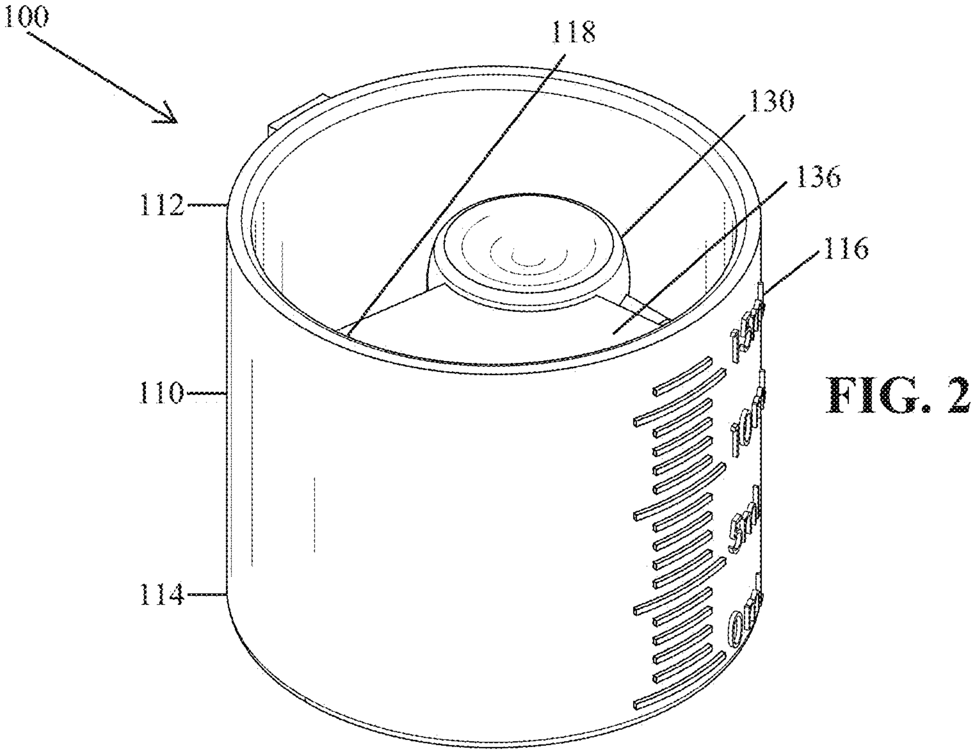
FIG. 2 is a front perspective view illustrating a device for removing a liquid from a container showing a cap coupled to a reservoir, according to an embodiment of the present disclosure.
Figure 3:
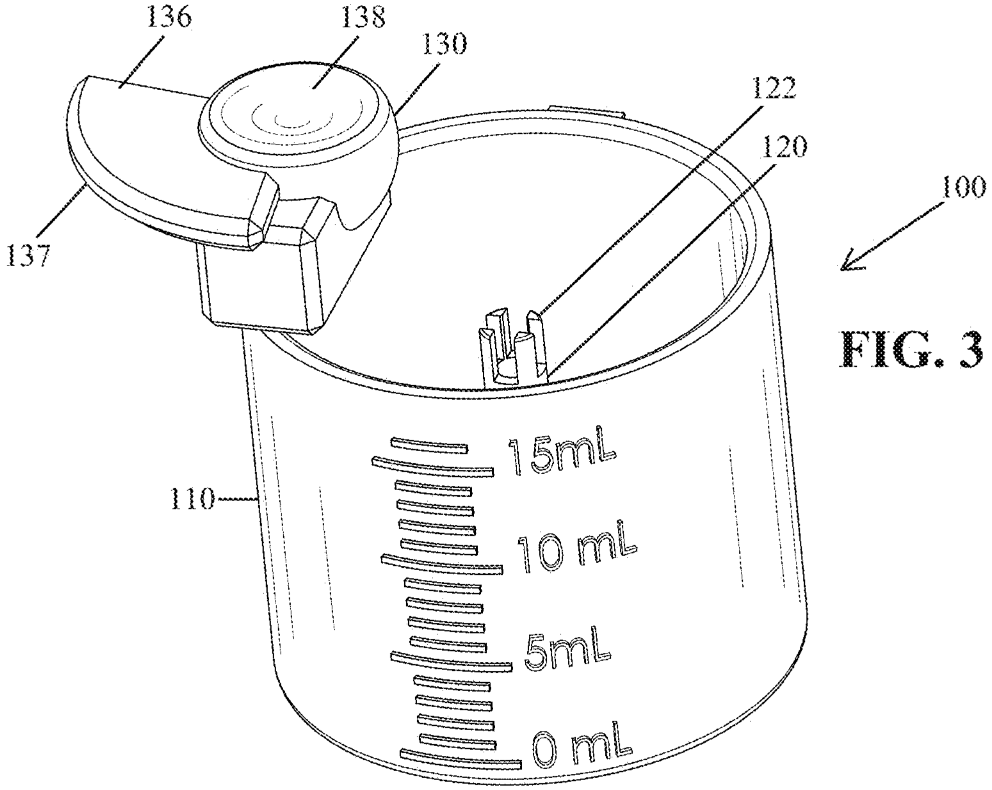
FIG. 3 is a front perspective partially exploded view illustrating a device for removing a liquid from a container showing the cap detached from a conduit associated with the reservoir, according to an embodiment of the present disclosure.

FIGS. 1-3 show embodiments of a device 100 for removing a liquid from a container having a depressible valve, such as container 140 shown in FIGS. 13-16. The device 100 may be configured to be removably coupled with a container 140 having a depressible valve controlling access to a liquid stored within the container 140. For example, the container 140 may be a pressurized aerosol container, such as a spray paint can. The device 100 may include a reservoir 110, a conduit 120, and a cap 130. The conduit 120 may include a first end 122 and a second end 124. The first end 122 of the conduit 120 may be fluidly coupled to the reservoir 110. The second end 124 of the conduit 120 may be fluidly coupled to the container 140. Depressing the conduit 120 may actuate the depressible valve (not shown) of the container 140 to provide fluid communication of the liquid from the container 140, through the conduit 120, and into the reservoir 110.

Figure 16:
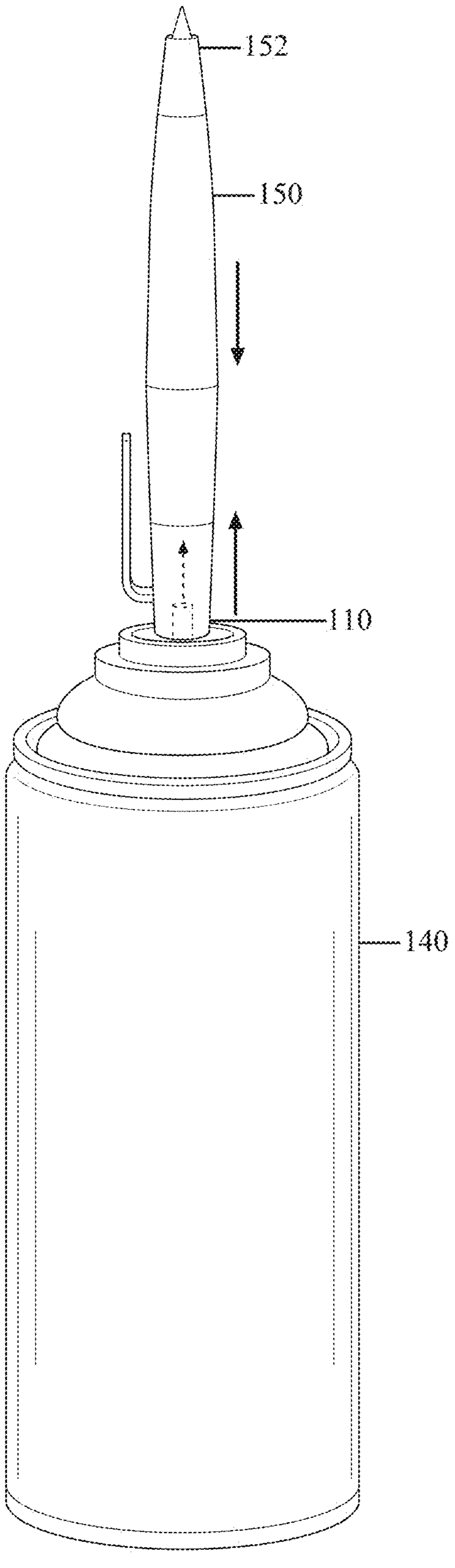
FIG. 16 is a front elevational view illustrating a device for removing a liquid from a container removably coupled to the container, according to another embodiment of the present disclosure.

The reservoir 110 may be embodied in various articles and implements. For example, in certain embodiments, such as shown in FIG. 16, the reservoir 110 may be contained within a writing implement 150, where the writing implement 150 may be configured as a paint pen. As shown in FIG. 16, the reservoir 110 may be in fluid communication with a distal end 152 of the writing implement 150. The distal end 152 may be configured to dispense the liquid from the reservoir 110, such as when the writing implement 150 is used to write, touch-up, or otherwise dispense the liquid from the reservoir 110.

Figure 4:
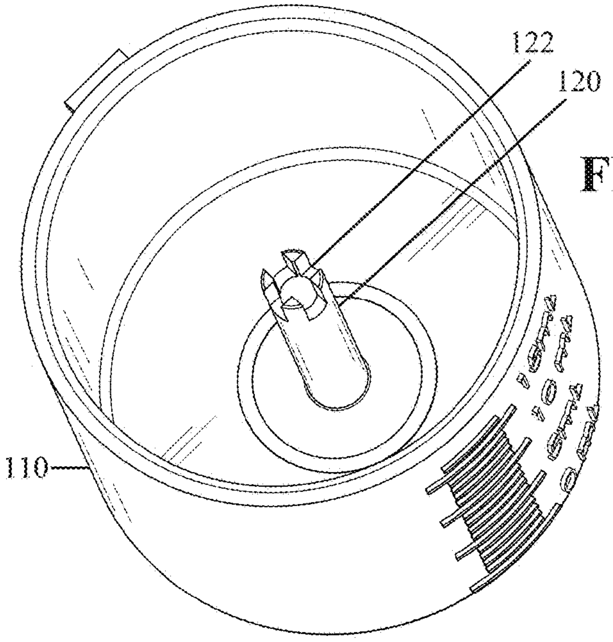
FIG. 4 is a top perspective view illustrating the conduit and the reservoir for a device for removing a liquid from a container, according to an embodiment of the present disclosure.
Figure 5:
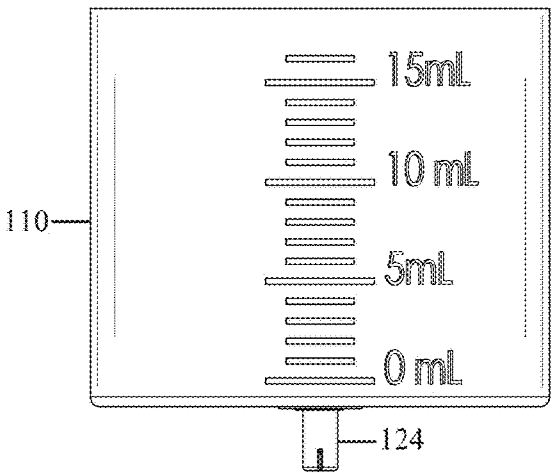
FIG. 5 is a front elevational view illustrating a reservoir for a device for removing a liquid from a container, according to an embodiment of the present disclosure.
Figure 6:
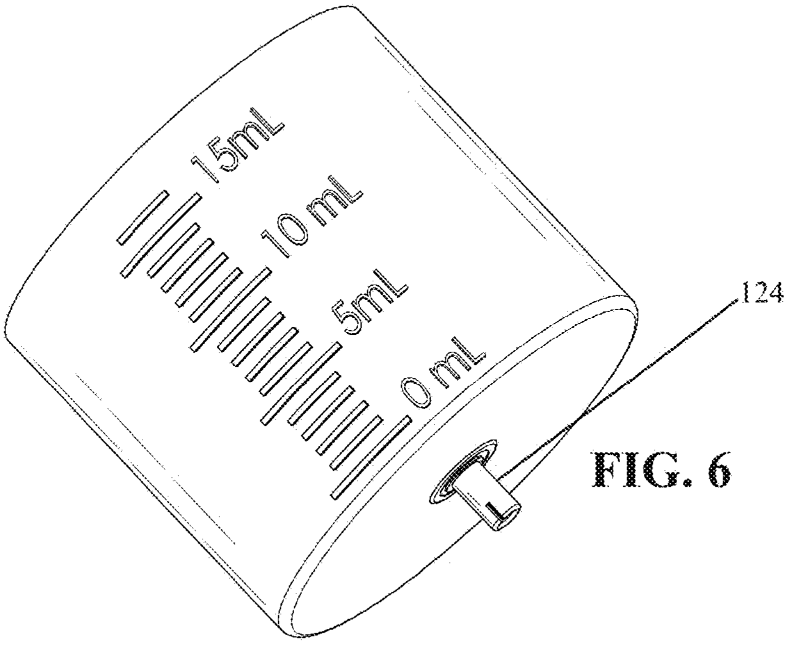
FIG. 6 is a bottom perspective view illustrating the reservoir for a device for removing a liquid from a container, according to an embodiment of the present disclosure.

As shown in FIGS. 1 and 2, the reservoir 110 may include a top 112 and a bottom 114. As shown in FIGS. 3 and 4, the first end 122 of the conduit 120 may be disposed intermediate the top 112 and the bottom 114 of the reservoir 110. The first end 122 of the conduit 120 may be coaxial with the reservoir 110. For example, where the reservoir 110 is generally cylindrical, as shown, the conduit 120 may be positioned coaxial with the cylindrical reservoir 110 with the first end 122 at an intermediate point between the top 112 and the bottom 114 of the reservoir 110. In certain embodiments, such as shown in FIGS. 5-6, the second end 124 of the conduit 120 may extend outward from the bottom 114 of the reservoir 110. The reservoir 110 may further include an indicium 116 configured to measure an amount of liquid collected within the reservoir 110. In particular, the reservoir 110 may include any appropriately desired indicia for indicating amounts of liquid within the reservoir 110.

The cap 130 may be configured to be removably coupled with the first end 122 of the conduit 120. The conduit 120 may be depressed using the cap 130 to direct liquid from the container 140 through the conduit 120 and into the reservoir 110. For example, the action of depressing the cap 130 may be translated through the conduit 120 to the stem 141 of the container 141, thereby actuating the depressible valve of the container 140. Alternatively, the reservoir 110 may be urged toward the container 140 so that the conduit 120, and the second end 124 of the conduit 120 in particular, is moved toward the stem 141 of the container 141, thereby actuating the depressible valve of the container 140.

Figure 7:
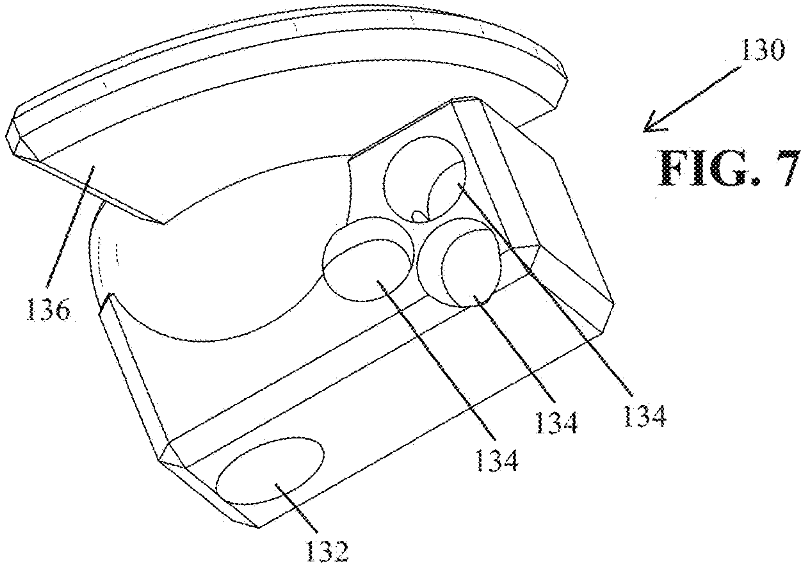
FIG. 7 is a bottom perspective view illustrating a cap for a device for removing a liquid from a container, according to an embodiment of the present disclosure.
Figure 8:
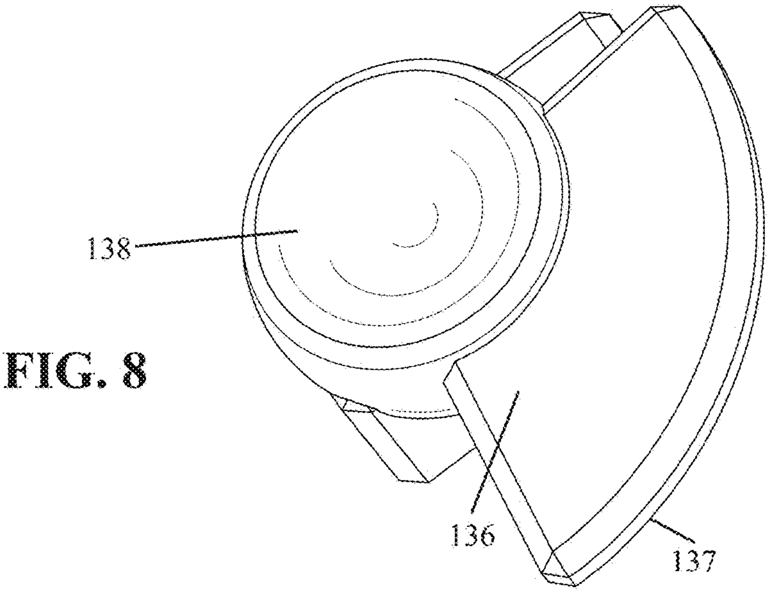
FIG. 8 is a top perspective view illustrating the cap for a device for removing a liquid from a container, according to an embodiment of the present disclosure.
Figure 9:
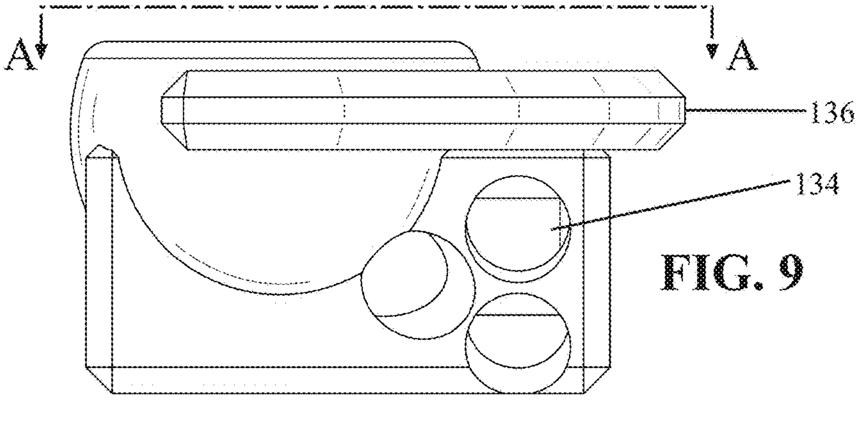
FIG. 9 is a front elevational view illustrating the cap for a device for removing a liquid from a container, according to an embodiment of the present disclosure.
Figure 13:
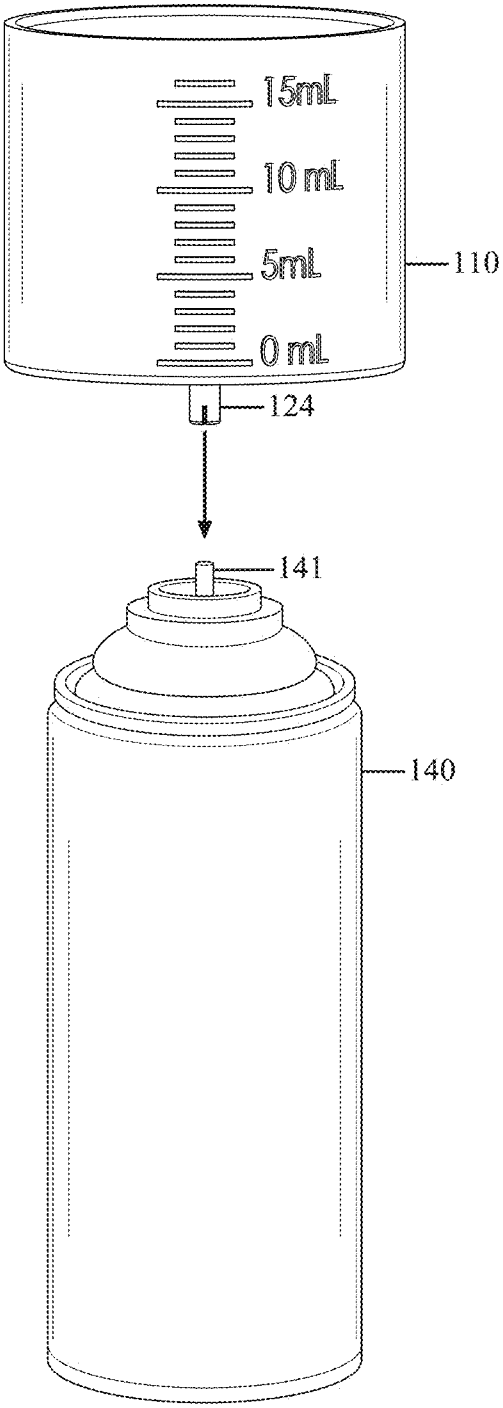
FIG. 13 is a front elevational view illustrating a device for removing a liquid from a container being removably coupled to a container, according to an embodiment of the present disclosure.
Figure 14:
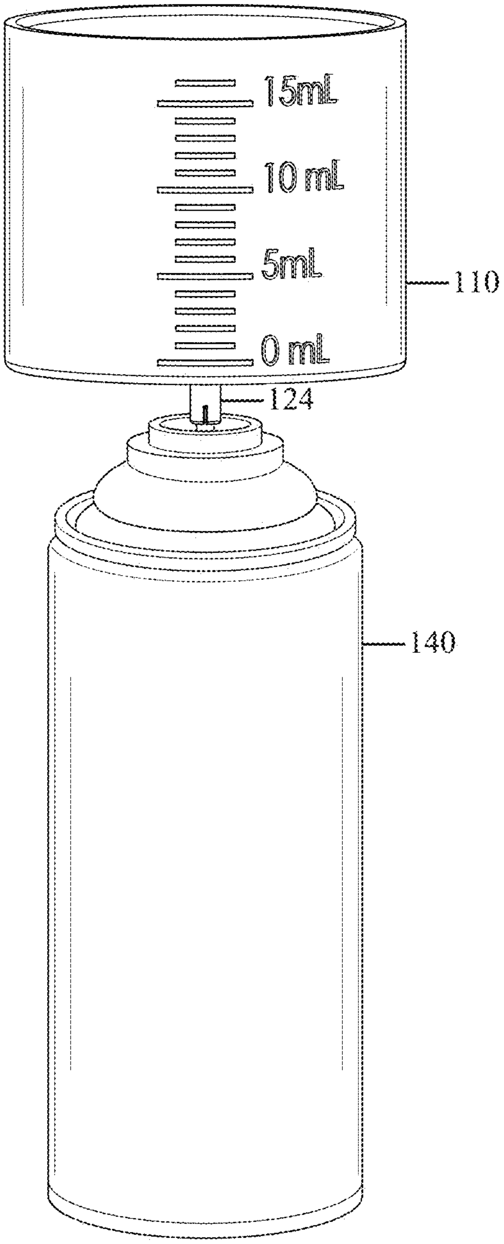
FIG. 14 is a front elevational view illustrating a device for removing a liquid from a container removably coupled to the container, according to an embodiment of the present disclosure.
Figure 15:
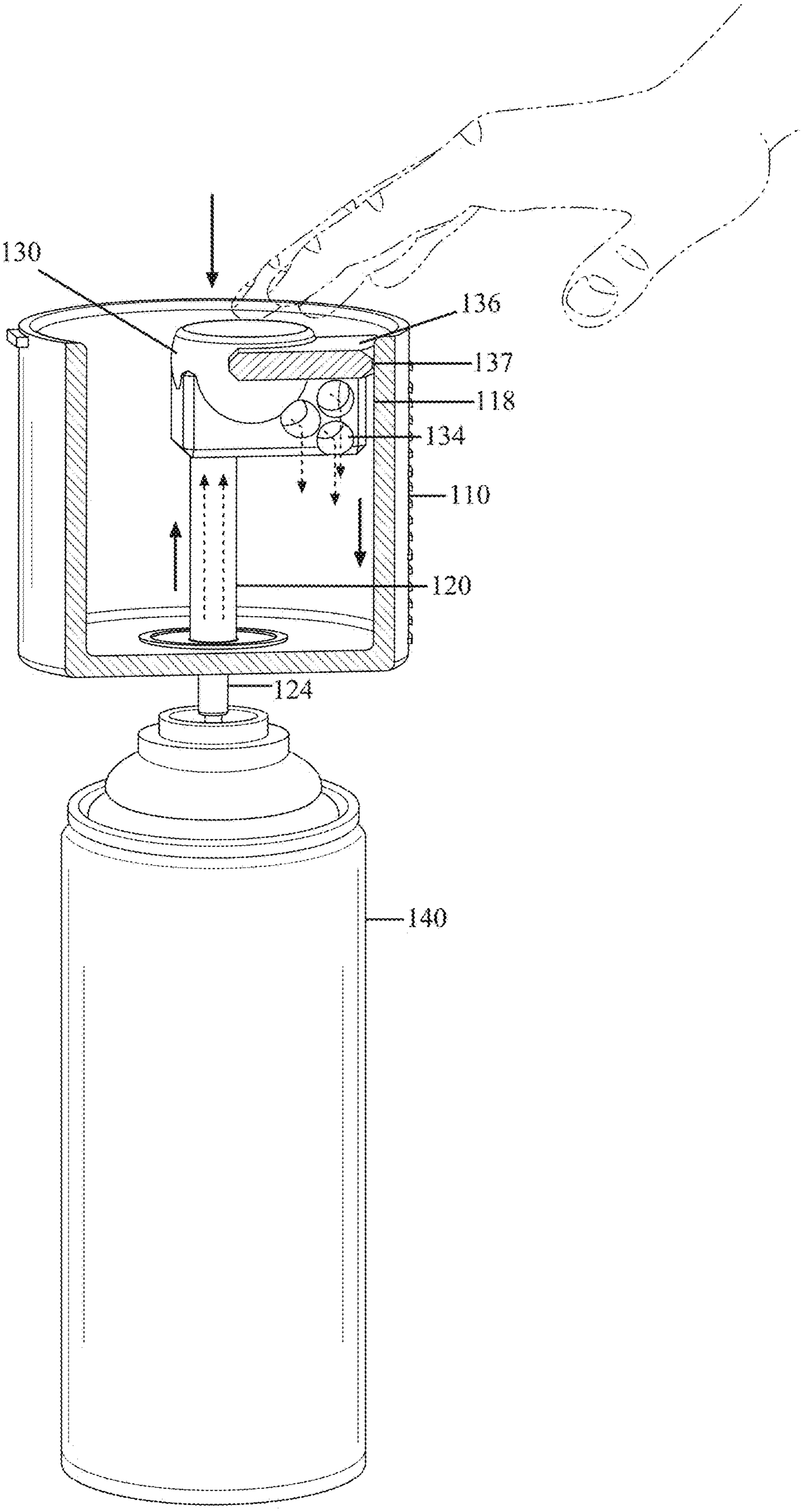
FIG. 15 is a front elevational cutaway view illustrating a device for removing a liquid from a container removably coupled to the container, where the device is being depressed onto the container, according to an embodiment of the present disclosure.

As shown in FIGS. 7 and 10, the cap 130 may include a bottom aperture 132 configured to be removably coupled with the first end 122 of the conduit 120. The cap 130 may also include an exit aperture 134 fluidly coupled to the bottom aperture 132. As shown in FIG. 15, the exit aperture 134 may direct liquid to the reservoir 110 when the conduit 120 is depressed using the cap 130. As shown in the cutaway view of FIG. 11, which shows an approximation of an internal channel 133 in dashed lines, the exit aperture 134 may be fluidly coupled to the bottom aperture 132 by the internal channel 133, which may run orthogonal to the bottom aperture 132. In certain embodiments, the exit aperture 134 may include a plurality of exit apertures 134. In particular embodiments, the exit aperture 134 may include three apertures. However, as described above, the exit aperture 134 may include any appropriately desired number of exit apertures 134.

As shown in FIGS. 2 and 15, the cap 130 may include a flange 136 configured to engage an interior side 118 of the reservoir 110 when the cap 130 is coupled to the first end 122 of the conduit 120. In some embodiments, when the cap 130 is coupled to the conduit 120, the flange 136 may be positioned between the top 112 of the reservoir 110 and the exit aperture 134. In this way, the flange 136 may shield and direct liquid ejection from the exit aperture(s) 134 into the reservoir 110 and prevent liquid from exiting the top 112 of the reservoir 110. In certain embodiments, the flange 136 may include a curved edge 137 configured to engage a portion of a curved interior side 118 of the reservoir 110. In this way, the curved edge 137 may slidably engage and ride along the curved interior side 118 of the reservoir 110 when the cap 130 is depressed. This may stabilize the cap 130 and conduit 120 relative to the reservoir 110 during the depressing motion and release thereof. In certain embodiments, the flange 136 may engage a portion of a circumference of the interior side 118, a majority of the circumference of the interior side 118, or even the entire circumference of the curved interior side 118 of the reservoir 110. In particular, the flange 136 may be appropriately shaped to engage an interior side 118 of differently shaped and configured reservoirs 110. In certain embodiments, the cap may include a concave surface 138 to center and stabilize depressing of the cap 130 coupled to the conduit 120.

As shown in FIGS. 12-15, to utilize the device 100 for removing a liquid from a container, the cap 130 may be removably coupled with a conduit 120 of the reservoir 110.

The second end 124 of the conduit 120 may be fluidly coupled to the container 140 by removably coupling the second end 124 of the conduit 120 with a stem 141 of the container 140. For example, where the container 140 is an aerosol container (e.g., spray paint can), the stem 141 may be accessed by removing a preexisting spray nozzle or button (not shown) from the stem 141 of the container 140. The stem 141 can be a hollow body mechanically and fluidly coupled to a depressible valve, where depressing the stem 141, for example, by depressing the second end 124 of the conduit 120 using the reservoir 110 or cap 130 translates the depressing motion to the stem 141 and onto the depressible valve permitting release of liquid from the container 140. As shown in FIG. 15, with the second end 124 of the conduit 120 fluidly coupled to the container 140, the conduit 120 may be depressed using the cap 130 to direct liquid from the container 140 through the conduit 120, out from the exit aperture 134 and into the reservoir 110.

In certain embodiments, the device 100 for removing a liquid from a container 140 may fluidly couple with the container 140 through a female to female coupling mechanism, a male to female coupling mechanism, and/or a male to male coupling mechanism. The device 100 for removing a liquid from a container 140 may also include an adapter for fluidly coupling to the container 140 as appropriately desired. In particular, as would be understood by someone of ordinary skill in the art, the device 100 for removing a liquid from a container 140 may fluidly couple to the container 140 using any appropriately desired mechanism for permitting a release of the liquid from the container 140.

Figure 17:
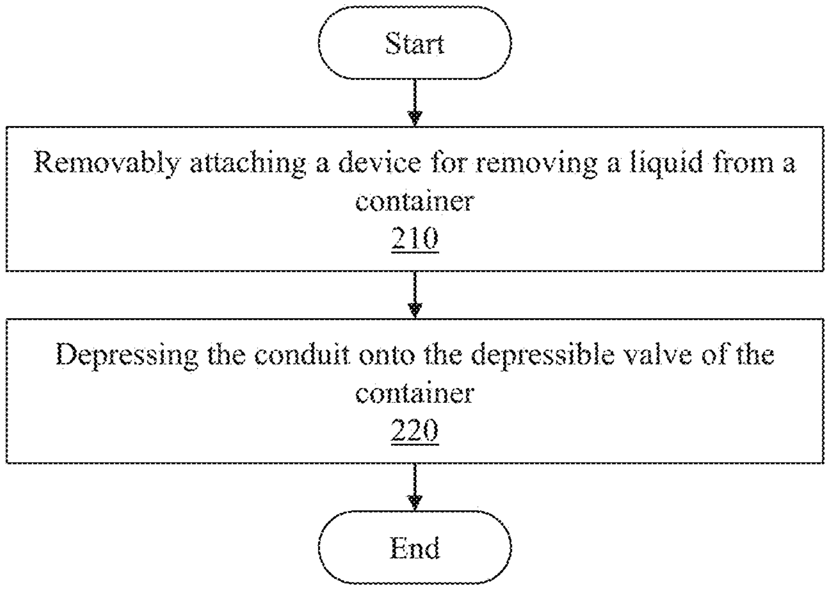
FIG. 17 is a flowchart illustrating a method of removing a liquid from a container, according to an embodiment of the present disclosure.

FIG. 17 is a flowchart that describes a method of removing a liquid from a container 140. In step 210 the method may include removably attaching a device 100 for removing the liquid from the container 140. The device 100 may include a reservoir 110 for holding liquid removed from the container 140 and a conduit 120. The conduit 120 may include a first end 122 and a second end 124. The first end 122 of the conduit 120 may be fluidly coupled to the reservoir 110. The second end 124 of the conduit 120 may be fluidly coupled to the container 140. In step 220, the conduit 120 may be depressed onto a depressible valve of the container 140. Depressing the conduit 120 may actuate the depressible valve of the container 140 to provide fluid communication of the liquid from the container 140, through the conduit 120, and into the reservoir 110. The method may further include removing the device 100 from the container 140 and accessing the liquid within the reservoir 110. In certain embodiments, a nozzle (not shown) of the container 140 may be removed before the device 100 is attached to the container 140. Alternatively, the container 140 may be provided without a nozzle, such that the device 100 may be attached without removing a nozzle.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A device for removing a liquid from a container, the container having a depressible valve, the device comprising:

a reservoir for holding the liquid removed from the container;

a conduit including a first end and a second end, the first end fluidly coupled to the reservoir, the second end configured to be fluidly coupled to the container, the conduit position fixed relative to the reservoir, wherein, when the second end of the conduit is fluidly coupled to the container, depressing the conduit actuates the depressible valve of the container to provide fluid communication of the liquid from the container, through the conduit, and into the reservoir; and a cap configured to be removably coupled with the first end of the conduit, wherein the conduit is configured to direct the liquid from the container, through the conduit, and into the reservoir when the conduit is depressed using the cap.

2. The device of claim 1, wherein each of the first end and the second end is stationary relative to the reservoir.

3. The device of claim 1, wherein the reservoir is contained within a writing implement.

4. The device of claim 3, wherein the reservoir is in fluid communication with a distal end of the writing implement opposite the conduit, wherein the distal end is configured to dispense the liquid from the reservoir.

5. The device of claim 1, wherein the reservoir includes a top and a bottom, and the first end of the conduit is disposed intermediate the top and the bottom of the reservoir.

6. The device of claim 5, wherein the second end of the conduit extends beyond an entirety of the bottom of the reservoir.

7. The device of claim 6, wherein the second end of the conduit is removable.

8. The device of claim 4, wherein the first end of the conduit is coaxial with the reservoir.

9. The device of claim 1, wherein the reservoir includes an indicium configured to measure an amount of the liquid within the reservoir.

10. The device of claim 1, wherein the cap includes a bottom aperture configured to be removably coupled with the first end of the conduit.

11. The device of claim 10, wherein the cap includes an exit aperture fluidly coupled to the bottom aperture, the exit aperture configured to direct the liquid to the reservoir when the conduit is depressed using the cap.

12. The device of claim 11, wherein the exit aperture is fluidly coupled to the bottom aperture by a channel orthogonal to the bottom aperture.

13. The device of claim 11, wherein the cap includes a flange configured to engage an interior side of the reservoir.

14. The device of claim 13, wherein the flange is positioned between a top of the reservoir and the exit aperture.

15. The device of claim 14, wherein the flange comprises a curved edge configured to engage a portion of a curved interior side of the reservoir.

16. The device of claim 15, wherein the flange engages an entire circumference of the curved interior side of the reservoir.

17. The device of claim 1, wherein the cap includes a concave surface for depressing the cap onto the conduit.

18. A method of removing a liquid from a container, the container having a depressible valve comprising:

removably attaching a device for removing the liquid from the container, wherein the device comprises:

a reservoir for holding the liquid removed from the container;

a conduit including a first end and a second end, the first end fluidly coupled to the reservoir, the second end fluidly coupled to the container, the conduit position fixed relative to the reservoir;

a cap configured to be removably coupled with the first end of the conduit; and depressing the conduit onto the depressible valve of the container, wherein the conduit is configured to direct the liquid from the container to the reservoir when the conduit is depressed onto the depressible valve of the container, and wherein the conduit is configured to direct the liquid from the container, through the conduit, and into the reservoir when the conduit is depressed using the cap.

19. The method of claim 18, further comprising removing the device from the container and accessing the liquid within the reservoir.

* * * * *